Sept. 28, 1954    B. S. KING    2,690,026
FISH LURE
Filed Sept. 26, 1952
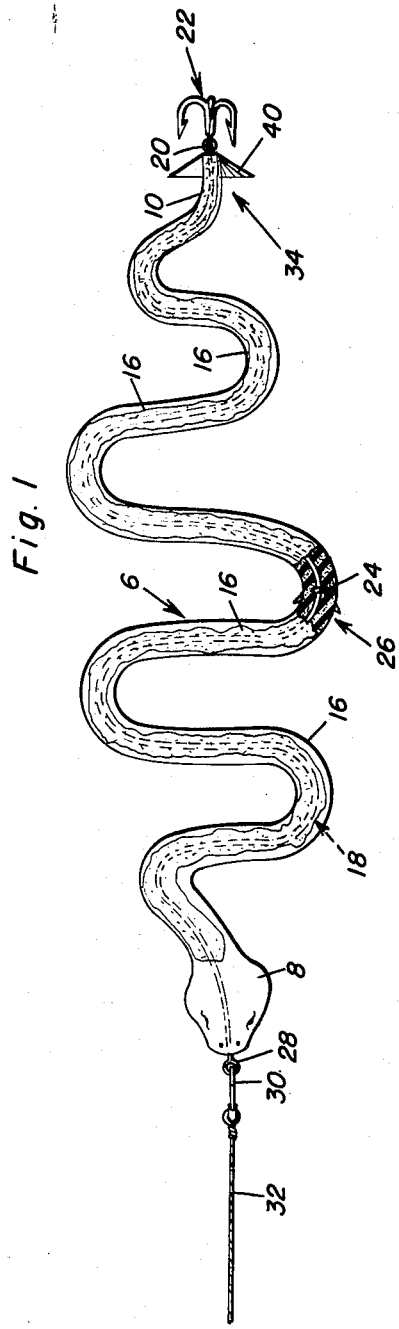
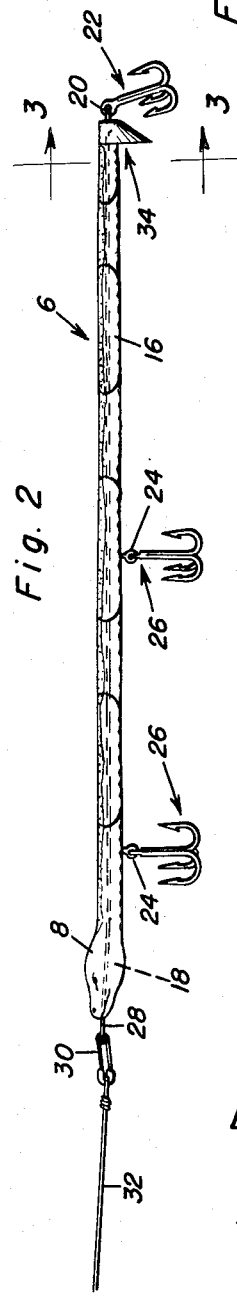
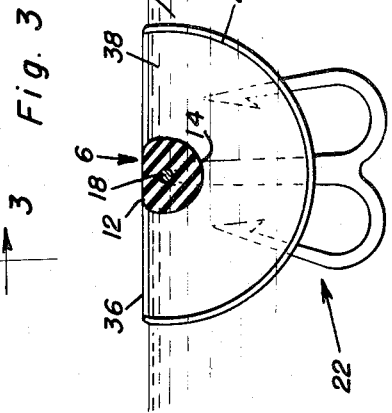
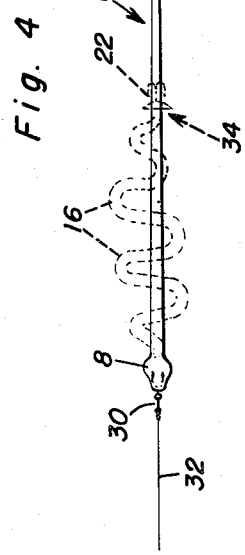
Bennington S. King
INVENTOR.

Patented Sept. 28, 1954

2,690,026

UNITED STATES PATENT OFFICE 2,690,026

FISH LURE

Bennington S. King, Anniston, Ala.

Application September 26, 1952, Serial No. 311,736

1 Claim. (Cl. 43—42.02)

1

The present invention relates to artificial fishing lures, generally speaking, and has reference in particular to a unique structural adaptation which is expressly designed to represent an eely snakelike creature which is adapted to appeal to and attarct certain game fish, especially those species which feed on small snakes, lamprey eels, water lizzards, etc.

An obvious object of the instant matter is to provide a simple, economical and practical artificial snake, the construction of which makes it possible for the angler to maneuver and manipulate the same to represent the natural swimming, resting and other recognized actions of a live snake while in the water, the same being a desirable type of artificial bait for casting or fly fishing.

Another object of the invention is to provide a lure of the stated type which utilizes a body of moldable elastic rubber, suitable plastics or the like susceptible of being made in different colors and resembling different species of snakes which live in and around ponds, springs, lakes, rivers, and the like.

A further object of the invention has to do with a lure which is characterized by an elongated elastic body exteriorly shaped to represent a snake, said body being resilient and embodying a series of substantially U-shaped bends, the latter cooperating in providing an illusion depicting a snake in the act of swimming, a wire embedded in and extending axially through said body from end to end of the latter, said wire being resilient and having U-shaped bends conformable with said first-named bends and serving as a "backbone," said body and wire, as a unit, being distendable when subjected to an axially applied, manually regulated pulling force, the trailing end of said wire having an eye with a fishhook attached thereto, the leading end having a similar eye, a fishing line attached to the latter eye, and a baffle member joined with the trailing end of said body forwardly of said fishhook, said member depending at right angles below the ventral portion of said body and being of a size much greater than the cross-section of the wire and body, the forward vertical face of said member being dished and forming a scoop.

Then, too, novelty is predicated upon the aforementioned body having sinuous alternating bends, the latter being flexibly resilient and extensible and contractible, there being a spinelike wire, also resilient, embedded in and extending axially through the body from end to

2 end and providing a distortable "backbone" for said body, said wire being possessed of requisite inherently extensible and retractable properties which normally define the stated sinuous bends but serve to allow said bends to flex and straighten out either wholly or partly when a pulling force is exerted on the leading end, at which time said baffle means functions as a drag, decelerates the movement of the trailing end, accelerates relative movement of the leading end and results in flexing the bends until they are caused to straighten wholly or partly due to the taughtening of the over-all body and wire.

Other objects, features and advantages will become more readily apparent from the following description and the accompanying sheet of drawings.

In the drawings:

Figure 1 is a top plan view of a snake-like artificial lure constructed in accordance with the principles of the present invention, a portion being broken away and shown in section;

Figure 2 is an edge or side elevation of the lure appearing in Figure 1;

Figure 3 is an enlarged cross-section on the vertical line 3—3 of Figure 2, looking in the direction of the arrows; and Figure 4 is a top plan view on a smaller scale showing the manner in which the lure is placed under tension and tautened so that it is straightened out and after which, when the tension is relieved, it resumes its serpentine normal shape.

Briefly summarized, the device herein under consideration comprises an elongated rubber body exteriorly shaped to represent a snake, said body being resilient and embodying a series of substantially U-shaped bends, the latter cooperating in providing an illusion depicting a snake in the act of swimming, a wire embedded in and extending axially through said body from end to end of the latter, said wire being resilient and having U-shaped bends conformable with said first-named bends and serving as a "backbone," said body and wire, as a unit, being distendable when subjected to an axially applied, manually regulated pulling force, the trailing end of said wire having an eye with a fishhook attached thereto, the leading end having a similar eye, a fishing line attached to the latter eye, and a baffle member joined with the trailing end of said body forwardly of said fishhook, said member depending at right angles below the ventral portion of said body and being of a size much greater than the cross-section of the wire and body, the forward vertical face of said member being dished and forming a scoop.

Referring now to the drawings by way of reference numerals and accompanying lead lines, it will be seen that the elongate rubber body is denoted generally by the numeral 6, the same having a suitably shaped head 8 and tail 10. The body is preferably semi-elliptical in cross-section to provide a flat top or dorsal portion 12 and a convex central portion 14. The body is constructed of rubber or suitable commercial plastics with requisite elastic and flexibility resilient properties. It is molded in such a way that its plan configuration is serpentine or sinuous as shown best in Figure 1. The alternating bends which are essentially U-shaped are denoted by the numeral 16—16. Embedded in the thus-formed and shaped body is a resilient or spring wire denoted by the numeral 18. This is a length commensurate with the length of the body and has corresponding U-shaped bends normally under tension but susceptible of being unbent and straightened out in an obvious manner when the proper stresses and forces are applied in a manner to be described. It will be noted that the rear end of the wire extends beyond the trailing end of the body where it is formed into an eye 20 carrying a multiple prong fishing hook 22. Similar eyes 24 are embedded at longitudinally spaced points and are provided with additional multiple prong fishhooks 26—26. There is also a protruding eye 28 at the leading end to which a suitable fastener or swivel 30 is connected and which serves to accommodate the fishing line 32.

At the trailing end of the body I provide baffle means which may be broadly referred to as a baffle member 34. This is also of the same rubber or equivalent material and it is integrated with the tail portion 10 in any suitable manner and encompasses a portion of the same. It is approximately semi-circular in outline and has a straight upper edge 36 which is coplanar with the flat top surface 12. The leading vertical side or surface is recessed or dished as at 38 to define a spoon or scoop 40 which functions as a traction resisting drag. That is to say, the water scoop acts as a drag somewhat similar to a sea anchor, which gives the lure the ability to stretch or become elongated when the fishing line is pulled or twitched in an obvious manner. After the tension on the line is released, the lure resumes its original serpentine shape. The action attained through proper manipulation and handling of the line and with the aid of the scoop gives the creature or "snake" the appearance of swimming and resting and otherwise maneuvering in the water. The resilient properties of the body in conjunction with the backbone or wire serve to produce the normal serpentine or sinuous form or shape seen in Figure 1. Action is accelerated when the lure is pulled faster through the water, as is obvious.

In view of the foregoing description taken in conjunction with the accompanying drawings, it is believed that a clear understanding of the device will be quite apparent to those skilled in this art. A more detailed description is accordingly deemed unnecessary.

Minor changes in shape, size, materials and arrangement of parts may be resorted to in actual practice without departing from the spirit and scope of the invention as claimed.

Having described the invention, what is claimed as new is:

An eely snake-like fishing lure for game fish comprising an elongated rubber body exteriorly shaped to represent a snake, said body being resilient and embodying a series of substantially U-shaped bends, the latter cooperating in providing an illusion depicting a snake in the act of swimming, a wire embedded in and extending axially through said body from end to end of the latter, said wire being resilient and having U-shaped bends conformable with said first-named bends and serving as a "backbone," said body and wire, as a unit, being distendable when subjected to an axially applied manually regulated pulling force, and a baffle member joined with the trailing end of said body, said member depending at right angles below the ventral portion of said body and being of a size much greater than the cross-section of the wire and body, the forward vertical face of said member being dished and forming a scoop, said member being rigid with the trailing end of the body and encompassing a portion of the same.

References Cited in the file of this patent

UNITED STATES PATENTS

| Number | Name | Date |
| --- | --- | --- |
| Re. 13,499 | Breder et al. | Dec. 24, 1912 |
| 1,049,345 | Dolman | Jan. 7, 1913 |
| 1,561,512 | Fredericks | Nov. 17, 1925 |
| 1,701,528 | Clewell | Feb. 12, 1929 |
| 1,840,273 | Lang | Jan. 5, 1932 |